United States Patent
He et al.

(10) Patent No.: US 10,032,264 B2
(45) Date of Patent: Jul. 24, 2018

(54) REDUCTION OF BACKGROUND INTERFERENCE IN A RADIATION IMAGE

(71) Applicant: H3D, Inc., Ann Arbor, MI (US)

(72) Inventors: Zhong He, Ann Arbor, MI (US); Weiyi Wang, Ann Arbor, MI (US); William Robert Kaye, Ann Arbor, MI (US); Christopher Glenn Wahl, Ann Arbor, MI (US); Jason Michael Jaworski, Ann Arbor, MI (US)

(73) Assignee: H3D, Inc., Ann Arbor, MI (US)

( * ) Notice: Subject to any disclaimer, the term of this patent is extended or adjusted under 35 U.S.C. 154(b) by 151 days.

(21) Appl. No.: 15/211,776

(22) Filed: Jul. 15, 2016

(65) Prior Publication Data

US 2018/0018763 A1    Jan. 18, 2018

(51) Int. Cl.
   *G06K 9/40* (2006.01)
   *G06T 5/50* (2006.01)
   (Continued)

(52) U.S. Cl.
   CPC ............... *G06T 5/50* (2013.01); *G01T 1/169* (2013.01); *G01T 1/2928* (2013.01); *G06T 5/002* (2013.01);
   (Continued)

(58) Field of Classification Search
   CPC ........ A61B 6/4258; A61B 6/08; H04N 5/347; H04N 5/357; G06T 5/002;
   (Continued)

(56) References Cited

U.S. PATENT DOCUMENTS 6,125,166 A * 9/2000 Takeo ................. A61B 6/4241
                                                         378/62
7,411,197 B2   8/2008 He et al.
                 (Continued)

FOREIGN PATENT DOCUMENTS

EP          0442468 A1     8/1991

OTHER PUBLICATIONS

Ogawa, et al. "A Practical method for Position-Dependent Compton-Scatter Correction in Single Photon Emission CT", IEEE, pp. 408-412, 1991.*

(Continued)

*Primary Examiner* — Daniel Mariam
(74) *Attorney, Agent, or Firm* — Quinn IP Law

(57) ABSTRACT

An imaging assembly includes a radiation camera configured to obtain position-sensitive radiation data of at least one source of interest. The assembly includes a controller includes a processor and tangible, non-transitory memory on which is recorded instructions for executing a method for reducing background interference in the position-sensitive radiation data in an image domain. The controller is programmed to generate a first set of image data ($G_1$) from the position-sensitive radiation data with a first energy window. A second set of image data ($G_2$) is generated from the position-sensitive radiation data with a second energy window such that the second energy window does not overlap with the first energy window. A third set of image data ($G_3$) is generated having reduced background interference, based at least partially on the first and second sets of image data.

18 Claims, 4 Drawing Sheets

(51) Int. Cl.
*G06T 5/00* (2006.01)
*H04N 5/347* (2011.01)
*G01T 1/169* (2006.01)
*G01T 1/29* (2006.01)

(52) U.S. Cl.
CPC ... *H04N 5/347* (2013.01); *G06T 2207/20224* (2013.01)

(58) Field of Classification Search
CPC ............. G06T 2207/20224; G06T 5/50; G01T 1/2928; G01T 1/169
USPC .............................. 382/128, 275; 378/19, 62
See application file for complete search history.

(56) References Cited

U.S. PATENT DOCUMENTS

| | | | |
|---|---|---|---|
| 9,230,354 B2* | 1/2016 | O'Connor | A61B 6/482 |
| 2008/0116380 A1 | 5/2008 | Takagi et al. | |
| 2015/0003591 A1* | 1/2015 | Schweizer | A61B 6/481 378/62 |
| 2015/0379699 A1 | 12/2015 | Takeuchi et al. | |

OTHER PUBLICATIONS

Christopher G. Wahl et al, The Polaris-H imaging spectrometer, Nuclear Instruments and Methods in Physics Research A, Jan. 14, 2015, pp. 377-381.

* cited by examiner

US 10,032,264 B2

REDUCTION OF BACKGROUND INTERFERENCE IN A RADIATION IMAGE

TECHNICAL FIELD

The present disclosure relates generally to reduction of background interference in a radiation image.

BACKGROUND

Radiation-emitting sources, including, but not limited to alpha, beta and gamma radiation, may be found in a variety of settings. Radiation cameras sensitive to position may be employed to pinpoint the location of a source of interest. However, the presence of interfering sources other than the source of interest may contaminate the data and make it difficult to pinpoint the location of the source of interest. Physically removing the contaminating source(s) may be impossible in many cases. It is desirable to find a method to reduce the background interference.

SUMMARY

An imaging assembly includes a radiation camera configured to obtain position-sensitive radiation data of at least one source of interest. The assembly includes a controller which includes a processor and tangible, non-transitory memory on which is recorded instructions for executing a method for reducing background interference in the position-sensitive radiation data in an image domain (as opposed to a spectral domain). The controller is programmed to generate a first set of image data ($G_1$) from the position-sensitive radiation data with a first energy window. A second set of image data ($G_2$) is generated from the position-sensitive radiation data with a second energy window such that the second energy window does not overlap with the first energy window. A third set of image data ($G_3$) is generated having reduced background interference, based at least partially on the first and second sets of image data. The first, second and third sets of image data are each divided into respective bins having respective numeric values.

The source of interest may be a gamma-emitting radio-isotope and the radiation camera may include a semiconductor detector, such as a cadmium zinc telluride (CdZnTe) compound detector. The first energy window extends between a first minimum energy ($MIN_1$) and a first maximum energy ($MAX_1$), inclusive. The second energy window extends between a second minimum energy ($MIN_2$) and a second maximum energy ($MAX_2$), inclusive. The first energy window may be below the second energy window such that the first maximum energy is less than the second minimum energy ($MAX_1 < MIN_2$). The first energy window may be about 650 to 672 keV and the second energy window may be about 620 to 642 keV. The first energy window may be above the second energy window such that first minimum energy is greater than the second maximum energy ($MIN_1 > MAX_2$).

Generating the third set of image data ($G_3$) may include subtracting a first threshold value from each of the respective bins of the first set of image data ($G_1 - T_1$); and subtracting a second threshold value from each of the respective bins of the second set of image data ($G_2 - T_2$). A subtracted image data (S) is obtained with respective bins having respective numeric values $[(G_1 - T_1) - (G_1 - T_2)]$. The respective bins of the first set of image data and the second set of image data define a respective minimum bin value. The first threshold value ($T_1$) and the second threshold value ($T_2$) may be the respective minimum bin values of the first set of image data ($G_1$) and the second set of image data ($G_1$).

Generating the third set of image data ($G_3$) may include determining if any of the respective bins in the subtracted image data (S) have a negative respective numeric value. Each of the respective bins having a negative respective numeric value is identified as a receptor bin ($R_{A,P} < 0$). Generating the third set of image data ($G_3$) may include, for each receptor bin ($R_{A,P}$), locating a first set of donor bins ($D_{r1}$) within a first radius ($r_1$) having a respective numeric value ($D_{r1} > 0$) that is positive. The respective numeric value of each of the first set of donor bins ($D_{r1}$) is transferred sequentially in order of closest proximity, to the receptor bin ($R_{A,P}$) until the receptor bin ($R_{A,P}$) has a zero value. The respective numeric values of the first set of donor bins ($D_{r1}$) are concurrently reduced.

If the receptor bin ($R_{A,P}$) remains negative, the controller is programmed to locate a next set of donor bins ($D_{rx}$) within a next radius ($r_x$) having a respective numeric value ($D_{rx} > 0$) that is positive. The next radius ($r_x$) is greater than a prior radius ($r_{x-1}$). The respective numeric value of each of the next set of donor bins ($D_{rx}$) is transferred sequentially in order of closest proximity, to the receptor bin ($R_{A,P}$) until the receptor bin ($R_{A,P}$) has a zero value. The respective numeric values of the next set of donor bins ($D_{rx}$) are concurrently reduced.

The above features and advantages and other features and advantages of the present disclosure are readily apparent from the following detailed description of the best modes for carrying out the disclosure when taken in connection with the accompanying drawings.

DESCRIPTION

Figure 1:
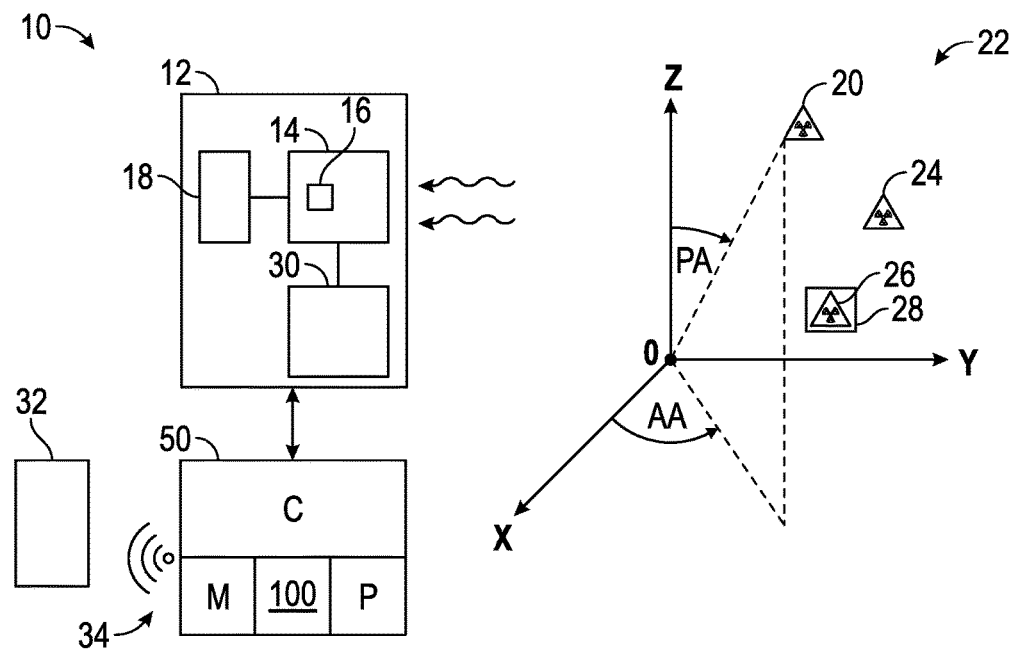
FIG. 1 is a schematic illustration of an imaging assembly having a controller.

Referring to the drawings, wherein like reference numbers refer to like components, FIG. 1 schematically illustrates an imaging assembly 10. The assembly 10 may take many different forms and include multiple and/or alternate components and facilities. The assembly 10 includes an imaging device 12 having a radiation camera 14 configured to obtain position-sensitive radiation data. The radiation camera 14 may include a sensor 16 configured to localize radiation sources in all directions simultaneously. The radiation camera 14 may be a Compton camera which utilizes Compton scattering to determine the spatial origin of the observed radiation. The radiation camera 14 may be an attenuation-based imaging device, such as a coded aperture or pinhole camera. The assembly 10 may include a spectrometer 18 that detects distribution of intensity (counts) of radiation versus the energy of the respective radiation. It is to be appreciated that the radiation camera 14 may include associated circuitry or electronics (not shown) appropriate to the application at hand. For instance, the circuitry may include a photomultiplier tube, a silicon photodiode, other photon-electron conversion devices, high voltage supply, preamplifier, amplifier and analog to digital converter (ADC).

Referring to FIG. 1, the assembly 10 includes a controller 50 (C) operatively connected to or in electronic communication with the radiation camera 14. The controller 50 may be an integral portion of, or a separate module operatively connected to, other components of the imaging device 12. The controller 50 may be configured to control the operation of the radiation camera 14 and as well as acquisition, processing and storage of the position-sensitive radiation data.

An XYZ axis having an origin (O) is shown in FIG. 1. Referring to FIG. 1, the position of the source of interest 20 may be described or specified based on its polar angle (PA) measured from the Z axis, and the azimuth angle (AA) of its orthogonal projection (on the XY plane that passes through the origin O and is orthogonal to the Z-axis), measured from the X-axis. The position of the source of interest 20 may be specified as a 2D direction vector, a 3-D position or with any other system of reference known to those killed in the art.

Referring to FIG. 1, radiation camera 14 is configured to obtain position-sensitive radiation data of at least one source of interest 20 positioned in a background 22. The source of interest 20 may be a gamma-emitting radioisotope. The source of interest 20 may emit alpha, beta and electromagnetic radiation, neutrons or any other type of radiation phenomenon known to those skilled in the art. In one example, the source of interest 20 is gamma-emitting Cesium-137. The sensor 16 may be a semiconductor detector, such as for example, a detector having a cadmium zinc telluride (CdZnTe) compound. Any sensor technology known to those skilled in the art may be employed for the radiation camera 14. The presence of an interfering source 24 may contaminate the radiation data and make it difficult to pinpoint the location of the source of interest 20. Referring to FIG. 1, the background 22 may include a second interfering source 26 enclosed in shielding 28.

Referring to FIG. 1, the assembly 10 includes an optical camera 30 configured to capture an optical image of the source of interest 20. A display device 32, such as a tablet, may connect wirelessly to the controller 50 via a Wi-Fi connection 34 for real-time display of the images some distance away.

Figure 2:
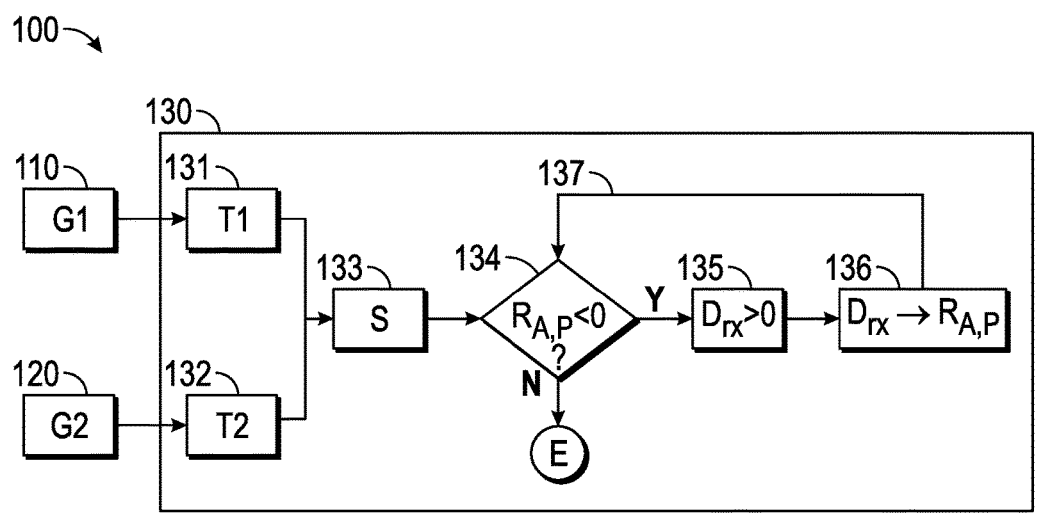
FIG. 2 is a flowchart stored on and executable by the controller of FIG. 1.

Referring to FIG. 1, the controller 50 includes at least one processor P and at least one memory M (or any non-transitory, tangible computer readable storage medium) on which are recorded instructions for executing method 100, shown in FIG. 2, for reducing background interference in the position-sensitive radiation data. The memory M can store controller-executable instruction sets, and the processor P can execute the controller-executable instruction sets stored in the memory M.

Figure 3:
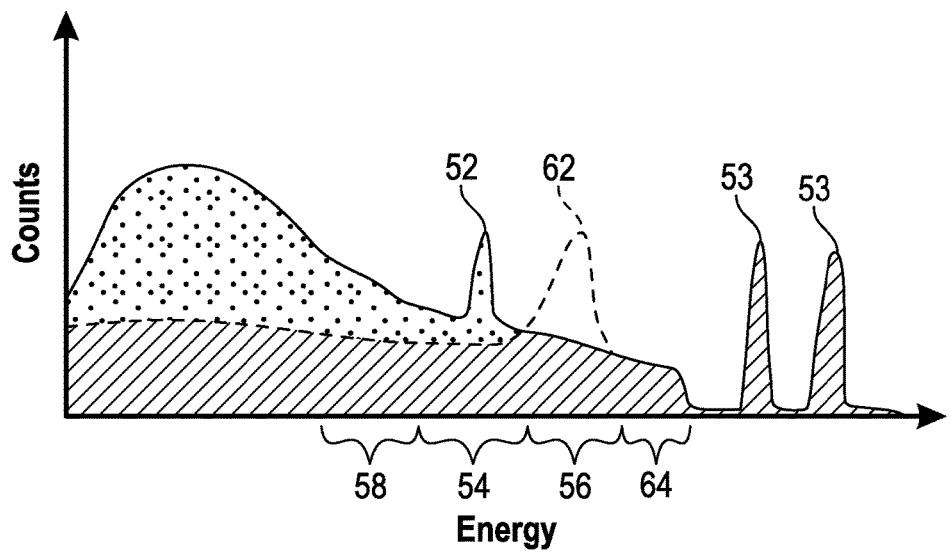
FIG. 3 is an example of a first set of image data ($G_1$) generated with a first energy window, with polar angle (PA) on the vertical axis and azimuthal angle (AA) on the horizontal axis.

FIG. 3 is an illustration of radiation data in the spectral mode, with counts versus energy of gamma rays detected from the source of interest 20 (Cesium-137 in this case) and the interfering source 24 (Cobalt-60 in this case). For each radiation source, the counts (i.e., intensity) may be observed from energies at and below their respective peak emissions.

Referring to FIG. 3, the contributions of the source of interest 20 and the interfering source 24 are shown in stipple and hatched patterns, respectively. The peak emission from the source of interest 20 (Cesium-137) is shown as peak of interest 52. The background peaks 53 represent emissions from the interfering source 24 (Cobalt-60). Cobalt-60 is known to have peaks at 1173 keV and 1333 keV. Cesium-137 emits at 662 keV, so it contributes nothing to the 700 keV region in a detector with sufficient energy resolution. However, Cobalt-60 has emissions which are above 1000 keV, which contaminate the entire spectrum from 0 keV to 1333 keV.

The method 100 allows the determination of location of the source of interest 20 in the presence of background interference in the image domain, as opposed to the spectral domain. All of the radiation data is acquired in a single measurement. Referring now to FIG. 2, a flowchart of the method 100 stored on and executable by the controller 50 of FIG. 1 is shown. Method 100 need not be applied in the specific order recited herein. Furthermore, it is to be understood that some steps may be eliminated. The controller 50 of FIG. 1 is specifically programmed to execute the steps of the method 100.

Figure 4:
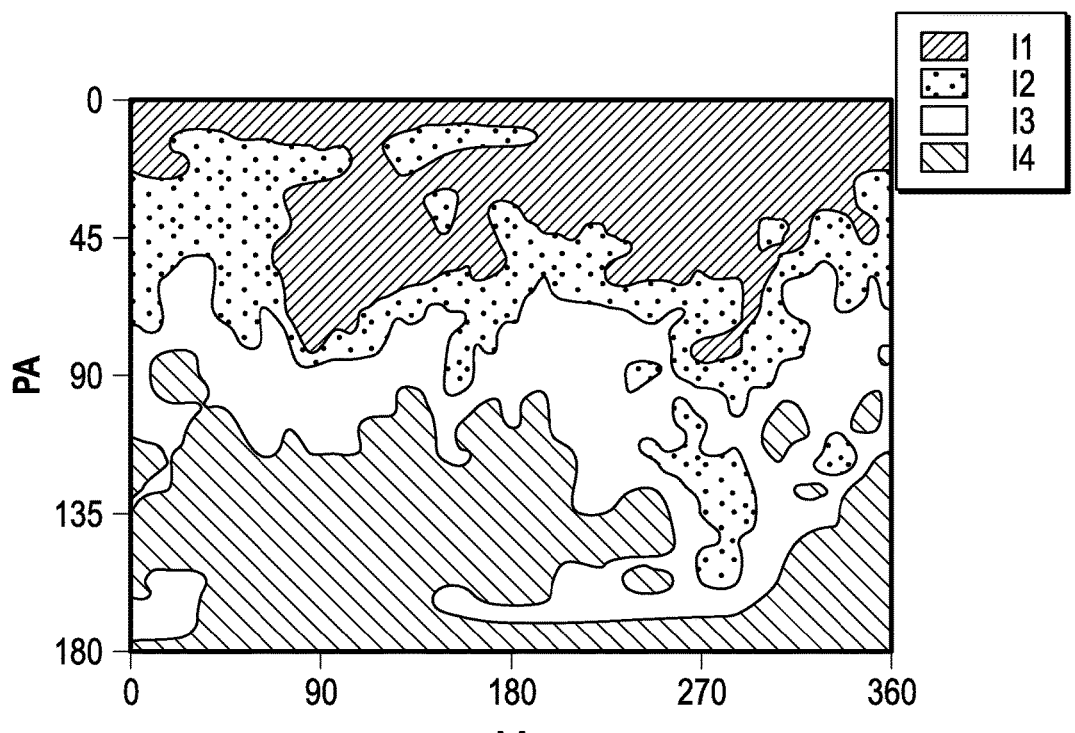
FIG. 4 is an example of a second set of image data ($G_2$) generated with a second energy window, with polar angle (PA) on the vertical axis and azimuthal angle (AA) on the horizontal axis.

Referring to FIG. 2, method 100 may begin with block 110, where the controller 50 is programmed or configured to generate a first set of image data ($G_1$) from the position-sensitive radiation data with a first energy window. Referring to FIG. 4, an example of a first set of image data ($G_1$) is shown, generated per block 110.

Figure 5:
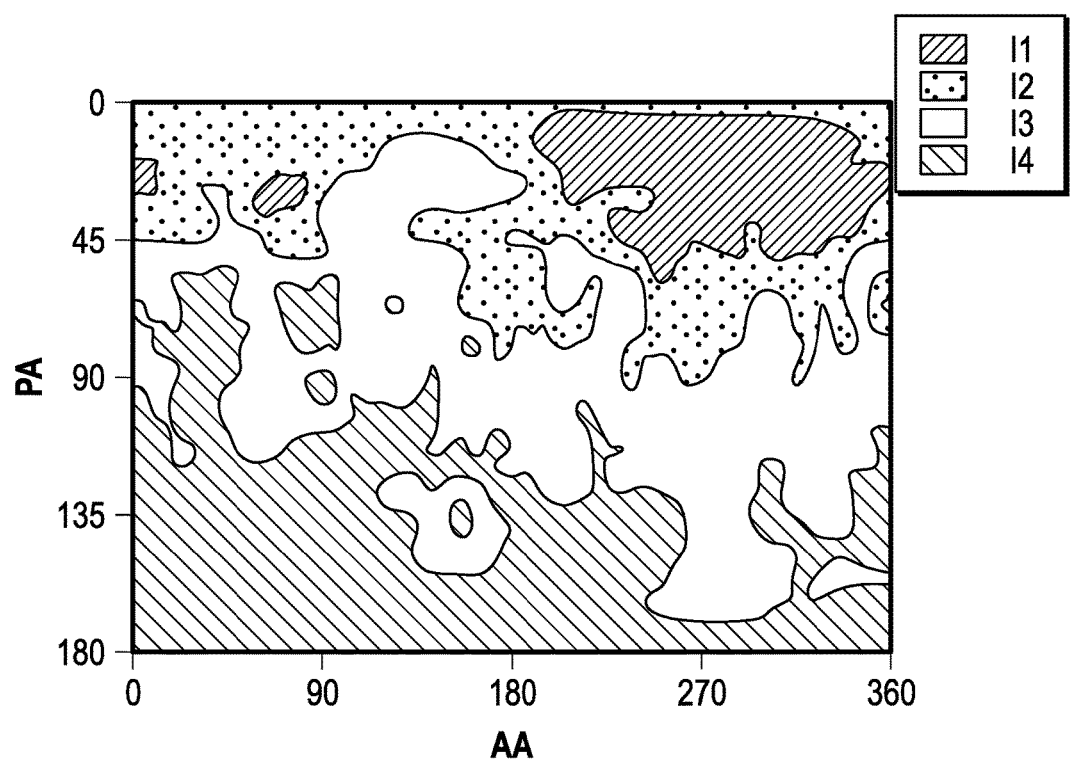
FIG. 5 is an example spectrum of a source of interest with interfering sources.

In block 120 of FIG. 2, the controller 50 is programmed to generate a second set of image data ($G_2$) from the position-sensitive radiation data with a second energy window such that the second energy window does not overlap with the first energy window. FIG. 5 is an example of a second set of image data ($G_2$), generated per block 120. The first and second sets of image data ($G_1$, $G_2$) (and the third set of image data ($G_3$) described below) are each divided into respective bins having respective numeric values. For example, the radiation data may be divided into 180 by 360 bins, with each bin being about 1° by 1°.

In block 130 of FIG. 2, the controller 50 is programmed to generate a third set of image data ($G_3$) based at least partially on the first and second sets of image data ($G_1$, $G_2$), with the third set of image data ($G_3$) being configured to have reduced background interference. Block 130 may include sub-blocks 131, 132, 133, 134, 135 and 136, described below.

Figure 6:
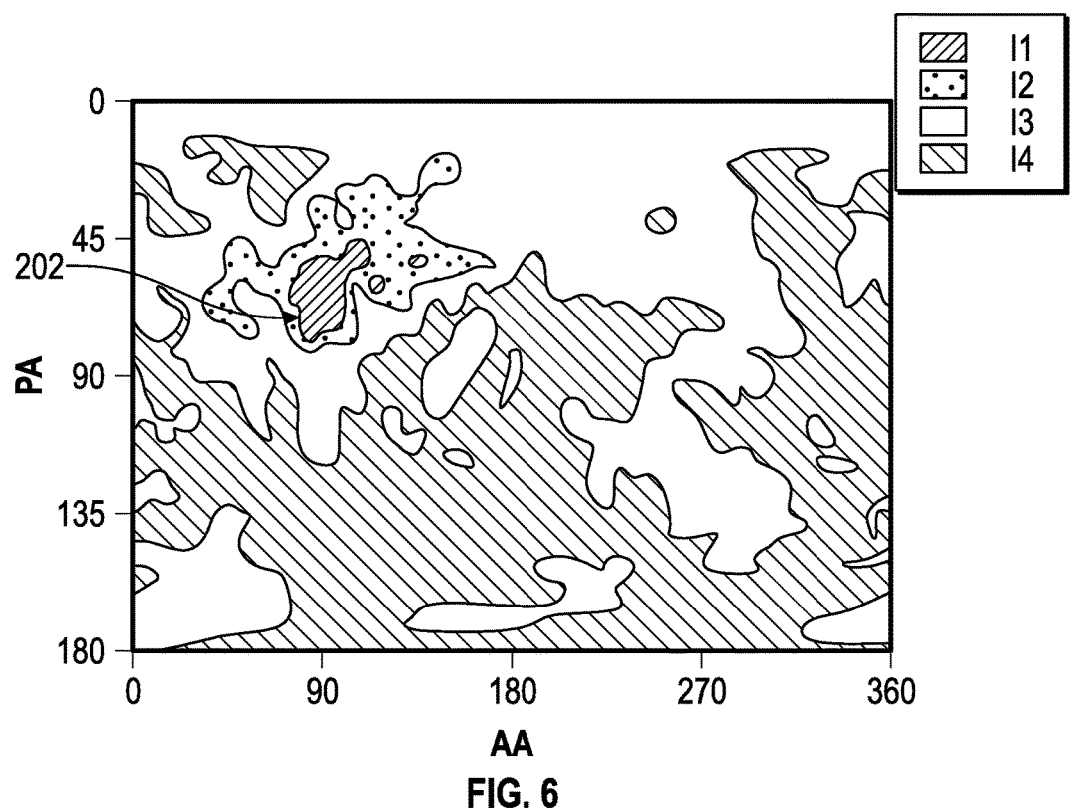
FIG. 6 is an example of a third set of image data ($G_2$) with the background interference reduced.

FIG. 6 is an example of a third set of image data ($G_3$), generated per block 130, with the background interference reduced. The first set of image data ($G_1$) may be a complete image as shown in FIG. 4. The second set of image data ($G_2$) may be a complete image as shown in FIG. 5. However, it is to be understood that the first and second sets of image data ($G_1$, $G_2$) may be partial data sets or incomplete images. Stated differently, instead of building complete images and subtracting, the third set of image data (($G_3$) may be constructed on an event-by-event basis.

FIGS. 4-6 show polar angle (PA) on the vertical axis and azimuthal angle (AA) on the horizontal axis. In the embodiment shown in FIGS. 4-6, the source of interest 20 is Cesium-137 and the interfering source 24 is Cobalt-60. FIG. 4 was generated with a first energy window of about 650-672 keV. FIG. 5 was generated with a second energy window of about 680 to 702 keV.

Referring to the legends on the right side of FIGS. 4-6, the region of highest intensity (I1) is shown with a hatched (forward-slash) pattern. The region of second-highest intensity (I2) is shown with a dotted pattern. The region of third-highest intensity (I3) is shown as blank (no pattern). The region of fourth-highest intensity (I4) is shown with a hatched (back-slash) pattern.

Referring to FIG. 4, the region of highest intensity (I1) is spread over almost the entire top portion of the first set of image data ($G_1$). It is difficult to pinpoint the location of the source of interest 20. Referring to FIG. 6, the region of highest intensity (I1) is spread over a limited region and the location 202 of the source of interest 20 is visible. The method 100 allows the elimination of false-positives and false-negatives.

Block 130 may include sub-blocks 131, 132, 133, 134, 135 and 136. In block 131 of FIG. 2, the controller 50 is programmed to subtract a first threshold value ($T_1$) from each of the respective bins of the first set of image data ($G_1-T_1$). In block 132 of FIG. 2, the controller 50 is programmed to subtract a second threshold value ($T_2$) from each of the respective bins of the second set of image data ($G_2-T_2$). The respective bins of the first set of image data and the second set of image data define a respective minimum bin value. The first threshold value ($T_1$) and the second threshold value ($T_2$) may be the respective minimum bin values of the first set of image data ($G_1$) and the second set of image data ($G_1$).

In sub-block 133 of FIG. 2, the controller 50 is programmed to obtain a subtracted image data (S) with respective bins having respective numeric values $[(G_1-T_1)-(G_1-T_2)]$ (determined in blocks 132 and 131).

Figure 7:
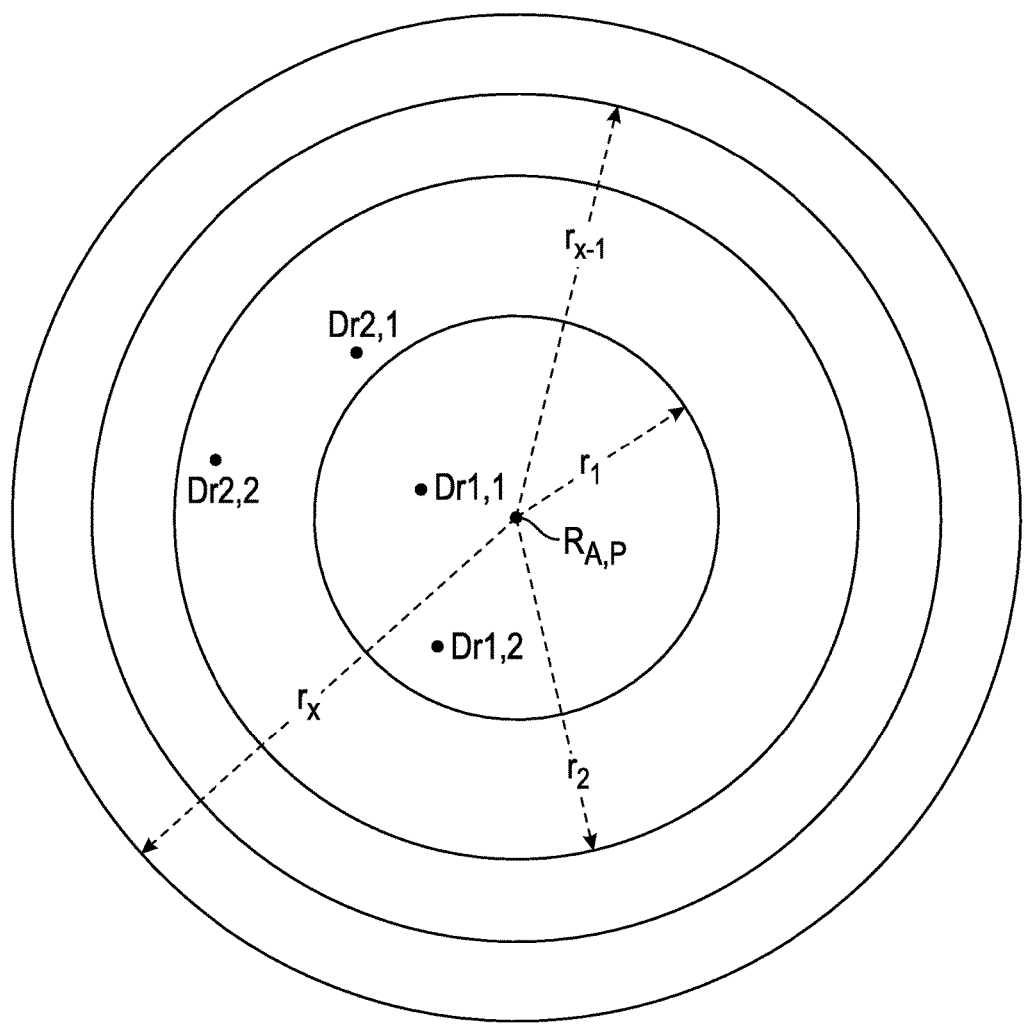
FIG. 7 is a schematic illustration of a receptor bin ($R_{A,P}$) employed in the flowchart of FIG. 2.

In block 134 of FIG. 2, the controller 50 is programmed to determine if any of the respective bins in the subtracted image data (S) have a negative numeric value. Each of the respective bins having a negative respective numeric value is labeled as a receptor bin ($R_{A,P}<0$). If there are no bins in the subtracted image data (S) with a negative numeric value, the method 100 is ended. FIG. 7 is a schematic illustration of a receptor bin ($R_{A,P}$). If there is at least one receptor bin ($R_{A,P}<0$), the method proceeds to block 135.

In block 135 of FIG. 2, for each receptor bin ($R_{A,P}$), the controller 50 is programmed to locate a first set of donor bins ($D_{r1}$) within a first radius ($r_1$) having a respective numeric value ($D_{r1}>0$) that is positive. Referring to FIG. 7, the first set of donor bins ($D_{r1}$) may include a first point $D_{r1, 1}$ and a second point $D_{r1, 2}$.

In block 136 of FIG. 2, the controller 50 is programmed to sequentially transfer, in order of closest proximity, the respective numeric values of each of the first set of donor bins ($D_{r1}$) to the receptor bin ($R_{A,P}$) until the receptor bin ($R_{A,P}$) has a zero value. The respective numeric values of the first set of donor bins ($D_{r1}$) are concurrently reduced. For example, the first point $D_{r1, 1}$ is closer to the receptor bin ($R_{A,P}$) than the second point $D_{r1, 2}$ and will transfer its value first. The method 100 then proceeds back to block 134, as indicated by line 137.

If the receptor bin ($R_{A,P}$) remains negative (i.e. has not reached zero), the controller 50 is programmed to locate a second set of donor bins ($D_{r2}$) (per block 135) within a second radius ($r_2$) having a respective numeric value ($D_{r2}>0$) that is positive. Referring to FIG. 7, the second radius ($r_2$) is greater than the first radius ($r_1$). The respective numeric value of each of the second set of donor bins ($D_{r2}$), are transferred sequentially (per block 136) in order of closest proximity to the receptor bin ($R_{A,P}$) until the receptor bin ($R_{A,P}$) has a zero value. The respective numeric values of the second set of donor bins ($D_{r2}$) are concurrently reduced. The third point $D_{r2, 1}$ is closer to the receptor bin ($R_{A,P}$) than the fourth point $D_{r2, 2}$ and will transfer its value first. The method 100 then proceeds back to block 134, as indicated by line 137.

If the receptor bin ($R_{A,P}$) remains negative (i.e. has not reached zero), the controller 50 is programmed to locate a next set of donor bins ($D_{rx}$) (per block 135) within a next radius ($r_x$) (see FIG. 7) having a respective numeric value ($D_{rx}>0$) that is positive. Referring to FIG. 7, the next radius ($r_x$) is greater than a prior radius ($r_{x-1}$). The respective numeric value of each of the next set of donor bins ($D_{rx}$) is transferred sequentially (per block 136) in order of closest proximity, to the receptor bin ($R_{A,P}$) until the receptor bin ($R_{A,P}$) has a zero value. The respective numeric values of the next set of donor bins ($D_{rx}$) are concurrently reduced.

The blocks 135 and 136 are repeated for each receptor bin ($R_{A,P}$). The method 100 continues similarly until there are no more bins with negative numeric values. Referring to FIG. 7, the first radius ($r_1$), second radius ($r_2$), prior radius ($r_{x-1}$) and next radius ($r_x$) may each be based at least partially on an imaging resolution of the radiation camera 14, e.g., a predetermined fraction or multiple of the imaging resolution.

The first and second energy windows to be sampled may be entered into the controller 50 by a user via a user interface (not shown) or may be set automatically by an algorithm within the controller 50. There are many possibilities for selection depending on the type of and number of interfering sources present and whether shielding is in place. The second energy window may be directly above or directly below, or much higher up or much lower, to avoid interfering peaks. The selection of the first and second energy windows to be sampled is a non-trivial exercise. For example, subtraction that includes the peak region itself may lead to a huge exaggeration of the interference.

The first energy window extends between a first minimum energy ($MIN_1$) and a first maximum energy ($MAX_1$), inclusive. The second energy window extends between a second minimum energy ($MIN_2$) and a second maximum energy ($MAX_2$), inclusive. In a first embodiment, the first energy window may be below the second energy window such that the first maximum energy is less than the second minimum energy ($MAX_1<MIN_2$). For example, referring to FIG. 3, where the source of interest 20 is Cesium-137 and the interfering source 24 is Cobalt-60, the first energy window may be selected as range 54 (650 to 672 keV) and the second energy window may be selected to be range 56 (680 to 702 keV).

In another embodiment, the first energy window may be above the second energy window such that first minimum energy is greater than the second maximum energy ($MIN_1>MAX_2$). For example, referring to FIG. 3, the first energy window may be selected as range 54 (650 to 672 keV) and the second energy window may be selected to be range 58 (620 to 642 keV). Referring to FIG. 1, this may be the selection where the source of interest 20 is Cesium-137, the interfering source 24 is Cobalt-60 and there is a second un-shielded interfering source 26 with a peak 62 (see FIG. 3) that is slightly above Cesium-137, for example around 685 keV. Here, the second interfering source 26 will have very little interference with the Cesium-137 due to the fact that it will have a Compton edge below 600 keV. Range 56 is not suitable as the second energy window because the second interfering source 26 is directly interfering with that region of the spectrum. Instead the region below the peak of interest 52, range 58, should be selected as the second energy window so that the Cobalt-60 interference is reduced without any influence from the peak 62 of the second interfering source 26.

Alternatively, the first energy window may be selected as range 54 (650 to 672 keV) and the second energy window may be selected to be range 64 (720 keV to 740 keV). Range 64 is a range above both the peak of interest 52 and the peak 62 of the second interfering source 26. That, at least, would be free from interference from either of the peaks 53, 62.

If the second interfering source 26 has a peak slightly above the source of interest 20 but the second interfering source 26 is enclosed in a shielding 28 (see FIG. 1) so that it does actually interfere with source of interest 20, then the interference will need to be unfolded. The peak region itself cannot be subtracted because that will be a huge exaggeration of the interference. The first energy window may be selected as range 54 (650 to 672 keV) and the second energy window may be selected to be a weighted sum of a plurality of ranges (the ranges 56, 58 and 64). A range of weighting factor may be employed.

The controller 50 (and execution of the method 100) improves the functioning of the assembly 10 by effectively pinpointing the location of the source of interest 20 with minimal data collection. All of the radiation data is acquired in a single measurement.

The controller 50 includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An imaging assembly comprising:
    a radiation camera configured to obtain position-sensitive radiation data of at least one source of interest;
    a controller operatively connected to the radiation camera, the controller including a processor and tangible, non-transitory memory on which is recorded instructions for executing a method for reducing background interference in the position-sensitive radiation data in an image domain;
    wherein execution of the instructions by the processor causes the controller to:
        generate a first set of image data ($G_1$) from the position-sensitive radiation data within a first energy window;
        generate a second set of image data ($G_2$) from the position-sensitive radiation data within a second energy window such that the second energy window does not overlap with the first energy window;
        generate a third set of image data ($G_3$) based at least partially on the first and second sets of image data, the third set of image data ($G_3$) being configured to have reduced background interference;
    wherein the first, second and third sets of image data are each divided into respective bins having respective numeric values; and
    wherein generating the third set of image data ($G_3$) includes:
        subtracting a first threshold value ($T_1$) from each of the respective bins of the first set of image data ($G_1-T_1$);
        subtracting a second threshold value ($T_2$) from each of the respective bins of the second set of image data ($G_2-T_2$); and
        obtaining a subtracted image data (S) with respective bins having respective numeric values $[(G_1-T_1)-(G_2-T_2)]$.

2. The assembly of claim 1, wherein the at least one source of interest is a gamma-emitting radioisotope.

3. The assembly of claim 1, wherein the radiation camera includes a sensor having a semiconductor detector.

4. The assembly of claim 1, wherein:
    the first energy window extends between a first minimum energy ($MIN_1$) and a first maximum energy ($MAX_1$), inclusive;
    the second energy window extends between a second minimum energy ($MIN_2$) and a second maximum energy ($MAX_2$), inclusive; and
    the first energy window is below the second energy window such that the first maximum energy is less than the second minimum energy ($MAX_1<MIN_2$).

5. The assembly of claim 1, wherein:
    the first energy window extends between a first minimum energy ($MIN_1$) and a first maximum energy ($MAX_1$), inclusive;

the second energy window extends between a second minimum energy ($MIN_2$) and a second maximum energy ($MAX_2$), inclusive; and the first energy window is above the second energy window such that the first minimum energy is greater than the second maximum energy ($MIN_1 > MAX_2$).

6. The assembly of claim 1, wherein:

the respective bins of the first set of image data and the second set of image data define a respective minimum bin value; and the first threshold value ($T_1$) and the second threshold value ($T_2$) are the respective minimum bin values of the first set of image data and the second set of image data.

7. The assembly of claim 1, wherein generating the third set of image data ($G_3$) includes:

determining if any of the respective bins in the subtracted image data have a negative respective numeric value, each of the respective bins having a negative respective numeric value being identified as a receptor bin ($R_{A,P<0}$).

8. The assembly of claim 7, wherein generating the third set of image data ($G_3$) includes:

for each of the receptor bins ($R_{A,P}$), locating a first set of donor bins ($D_{r1}$) within a first radius ($r_1$) having a respective numeric value ($D_{r1} > 0$) that is positive; and transferring the respective numeric value of each of the first set of donor bins ($D_{r1}$) sequentially in order of closest proximity, to the receptor bin ($R_{A,P}$) until the receptor bin ($R_{A,P}$) has a zero value, such that the respective numeric values of the first set of donor bins ($D_{r1}$) are concurrently reduced.

9. The assembly of claim 8, wherein the first radius ($r_1$) is based at least partially on an imaging resolution of the radiation camera.

10. The assembly of claim 8, wherein the controller is programmed for:

if the receptor bin ($R_{A,P}$) remains negative, locating a second set of donor bins ($D_{r2}$) within a second radius ($r_2$) having a respective numeric value ($D_{r2} > 0$) that is positive, the second radius ($r_2$) being greater than the first radius ($r_1$); and transferring the respective numeric value of each of the second set of donor bins ($D_{r2}$), sequentially in order of closest proximity, to the receptor bin ($R_{A,P}$) until the receptor bin ($R_{A,P}$) has a zero value, such that the respective numeric values of the second set of donor bins ($D_{r2}$) are concurrently reduced.

11. The assembly of claim 10, wherein the controller is programmed for:

if the receptor bin ($R_{A,P}$) remains negative, locating a next set of donor bins ($D_{rx}$) within a next radius ($r_x$) having a respective numeric value ($D_{rx} > 0$) that is positive, the next radius ($r_x$) being greater than a prior radius ($r_{x-1}$); and transferring the respective numeric value of each of the next set of donor bins ($D_{rx}$) sequentially in order of closest proximity, to the receptor bin ($R_{A,P}$) until the receptor bin ($R_{A,P}$) has a zero value, such that the respective numeric values of the next set of donor bins ($D_{rx}$) are concurrently reduced.

12. A method of reducing background interference in a position-sensitive radiation data of at least one source of interest obtained by a radiation camera in an imaging assembly, the assembly having a controller, the method comprising:

generating a first set of image data ($G_1$) from the position-sensitive radiation data within a first energy window;

generating a second set of image data ($G_2$) from the position-sensitive radiation data within a second energy window such that the second energy window does not overlap with the first energy window;

generating a third set of image data ($G_3$) based at least partially on the first and second sets of image data, the third set of image data ($G_3$) being configured to have reduced background interference;

wherein the first, second and third sets of image data are each divided into respective bins having respective numeric values; and wherein generating the third set of image data ($G_3$) includes:

subtracting a first threshold value ($T_1$) from each of the respective bins of the first set of image data ($G_1 - T_1$);

subtracting a second threshold value ($T_2$) from each of the respective bins of the second set of image data ($G_2 - T_2$); and obtaining a subtracted image data (S) with respective bins having respective numeric values $[(G_1 - T_1) - (G_2 - T_2)]$.

13. The method of claim 12, wherein:

the first energy window extends between a first minimum energy ($MIN_1$) and a first maximum energy ($MAX_1$), inclusive;

the second energy window extends between a second minimum energy ($MIN_2$) and a second maximum energy ($MAX_2$), inclusive; and the first energy window is below the second energy window such that the first maximum energy is less than the second minimum energy ($MAX_1 < MIN_2$).

14. The method of claim 12, wherein:

the respective bins of the first set of image data and the second set of image data define a respective minimum bin value; and the first threshold value ($T_1$) and the second threshold value ($T_2$) are the respective minimum bin values of the first set of image data and the second set of image data.

15. The method of claim 12, wherein generating the third set of image data ($G_3$) includes:

determining if any of the respective bins in the subtracted image data (S) have a negative respective numeric value, each of the respective bins having a negative respective numeric value being identified as a receptor bin ($R_{A,P} < 0$).

16. The method of claim 15, wherein generating the third set of image data ($G_3$) includes:

for each of the receptor bins ($R_{A,P}$), locating a first set of donor bins ($D_{r1}$) within a first radius ($r_1$) having a respective numeric value ($D_{r1} > 0$) that is positive; and transferring the respective numeric value of each of the first set of donor bins ($D_{r1}$) sequentially in order of closest proximity, to the receptor bin ($R_{A,P}$) until the receptor bin ($R_{A,P}$) has a zero value, such that the respective numeric values of the first set of donor bins ($D_{r1}$) are concurrently reduced.

17. The method of claim 16, wherein the first radius ($r_1$) is based at least partially on an imaging resolution of the radiation camera.

18. The method of claim 16, wherein the controller is programmed for:

if the receptor bin ($R_{A,P}$) remains negative, locating a next set of donor bins ($D_{rx}$) within a next radius ($r_x$) having a respective numeric value ($D_{rx} > 0$) that is positive, the next radius ($r_x$) being greater than a prior radius ($r_{x-1}$); and transferring the respective numeric value of each of the next set of donor bins ($D_{rx}$) sequentially in order of closest proximity, to the receptor bin ($R_{A,P}$) until the receptor bin ($R_{A,P}$) has a zero value, such that the respective numeric values of the next set of donor bins ($D_{rx}$) are concurrently reduced.

\* \* \* \* \*